(12) United States Patent
Nivlet et al.

(10) Patent No.: US 11,874,419 B2
(45) Date of Patent: Jan. 16, 2024

(54) SYSTEM AND METHOD FOR AUTOMATED DOMAIN CONVERSION FOR SEISMIC WELL TIES

(71) Applicant: SAUDI ARABIAN OIL COMPANY, Dhahran (SA)

(72) Inventors: Philippe Georges Christophe Nivlet, Alkhobar (SA); Robert James Smith, Dhahran (SA); Nasher Muqbel AlBinHassan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 114 days.

(21) Appl. No.: 17/363,660

(22) Filed: Jun. 30, 2021

(65) Prior Publication Data
US 2023/0003912 A1    Jan. 5, 2023

(51) Int. Cl.
  *G01V 1/32* (2006.01)
  *G01V 1/40* (2006.01)
  *G01V 1/28* (2006.01)

(52) U.S. Cl.
  CPC .............. *G01V 1/32* (2013.01); *G01V 1/282* (2013.01); *G01V 1/40* (2013.01)

(58) Field of Classification Search
  CPC ............. G01V 1/32; G01V 1/40; G01V 1/282
  See application file for complete search history.

(56) References Cited

U.S. PATENT DOCUMENTS

| | | | | |
|---|---|---|---|---|
| 6,374,185 B1 * | 4/2002 | Taner | .............. | G01V 1/40 |
| | | | | 702/14 |
| 7,433,786 B2 * | 10/2008 | Adams | .............. | G01V 1/30 |
| | | | | 702/11 |
| 9,359,881 B2 * | 6/2016 | DiSantis | ........... | E21B 44/00 |
| 2015/0316673 A1 * | 11/2015 | Wiener | ............ | G01V 1/32 |
| | | | | 702/14 |
| 2019/0034812 A1 | 1/2019 | Borrel et al. | | |

(Continued)

FOREIGN PATENT DOCUMENTS

WO    WO-2016168617 A1 *    10/2016    .............    E21B 44/00

OTHER PUBLICATIONS

Cui, T. et al.; "Drift time estimation by dynamic time warping"; Annual International Meeting, SEG, Expanded Abstracts, 2015, pp. 757-761 (5 pages).

(Continued)

*Primary Examiner* — John E Breene
*Assistant Examiner* — Yaritza H Perez Bermudez
(74) *Attorney, Agent, or Firm* — Osha Bergman Watanabe & Burton LLP

(57) ABSTRACT

A method is claimed for automatically transforming sonic well logs from a depth domain to a seismic two-way travel-time domain. The method includes obtaining a training well with a measured sonic well log in the depth domain and a borehole seismic dataset in the depth domain and obtaining an application well with only a measured sonic well log in the depth domain. The method further includes training a network to predict a transformed sonic well log for the training well based, at least in part, on the measured sonic well log and the borehole seismic dataset in the training well, and predicting with the network, the transformed sonic well log in the application well.

18 Claims, 10 Drawing Sheets

(56) References Cited

U.S. PATENT DOCUMENTS

2022/0351037 A1\* 11/2022 Li .......................... G06F 30/27

OTHER PUBLICATIONS

Herrera, R. H. and van der Baan, M.; "Automated Seismic-to-well Ties?"; 74th EAGE Conference, Expanded Abstracts, I031; Copenhagen, Denmark, Jun. 4-7, 2012 (5 pages).

Box, R. and Lowrey, P.; "Reconciling sonic logs with check-shot surveys: Stretching synthetic seismograms", The Leading Edge, Jun. 2003, pp. 510-517 (6 pages).

Zhang, B. et al.; "Accelerate Well Correlation with Deep Learning"; Search and Discovery Article #42429, Aug. 19, 2019 (8 pages).

Begstra, J.,et al.; "Algorithms for Hyper-Parameter Optimization"; 24th Conference on Advances in Neural Information Processing Systems, 2011 (9 pages) [https://papers.nips.cc/paper/4443-algorithms-for-hyper-parameter-optimization.pdf].

Hochreiter, S. and J. Schmidhuber; "Long Short-Term Memory"; Neural Computation, 9, 1997, pp. 1735-1780 (33 pages).

Kingma, D. P. and J. Ba; "Adam: A Method for Stochastic Optimization"; 3rd International Conference on Learning, arXiv preprint arXiv: 1412.6980, Jul. 23, 2015 (15 pages).

Bai, S., Kolter, J. Z., & Koltun, V. ; "An Empirical Evaluation of Generic Convolutional and Recurrent Networks for Sequence Modeling"; arXiv preprint arXiv:1803.01271, Apr. 19, 2018 (14 pages).

Cho, K. et al.; "Learning Phrase Representations using RNN Encoder-Decoder for Statistical Machine Translation", arXiv:1406.1078, Sep. 3, 2014 (15 pages).

Isadora A. S. et al.; "Comparison between deterministic and statistical wavelet estimation methods through predictive deconvolution: Seismic to well tie example from the North Sea"; Journal of Applied Geophysics 136, 2016 (17 pages).

\* cited by examiner

SYSTEM AND METHOD FOR AUTOMATED DOMAIN CONVERSION FOR SEISMIC WELL TIES

BACKGROUND

In the oil and gas industry, surface seismic datasets and well logs both play an important role in determining the presence and location of hydrocarbon reservoirs and in planning where to drill oil and gas wells. Surface seismic datasets provide information on the subsurface over a large spatial area but are recorded in the two-way seismic travel-time domain. The depth of subsurface features estimated from a seismic dataset alone may contain a significant uncertainty.

Well logs provide information only at, or near, the wells in which they are recorded. However, well logs are recorded in the depth domain and consequently the depth of a subsurface feature estimated from well logs contains a low uncertainty at the points at which wells intersects the feature.

It is desirable to combine well logs recorded in the depth domain with surface seismic datasets recorded in the two-way seismic travel-time domain, to reduce the uncertainty in the determination of the depth or the two-way seismic travel time of subsurface features over large spatial areas.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method is claimed for automatically transforming well logs from a depth domain to a seismic two-way travel-time domain. The method includes obtaining a training well with a measured sonic well log in the depth domain and a borehole seismic dataset in the depth domain and obtaining an application well with only a measured sonic well log in the depth domain. The method further includes training a network to predict a transformed sonic well log for the training well based, at least in part, on the measured sonic well log and the borehole seismic dataset in the training well, and predicting with the network, the transformed sonic well log in the application well.

In general, in one aspect, embodiments relate to a non-transitory computer readable medium storing instructions executable by a computer processor, the instructions comprising functionality for automatically transforming sonic well logs from a depth domain to a seismic two-way travel-time domain. The instructions comprising further include functionality for obtaining a training well with a measured sonic well log in the depth domain and a borehole seismic dataset in the depth domain and obtaining an application well with only a measured sonic well log in the depth domain. The instructions comprising further include functionality for training a network to predict a transformed sonic well log for the training well based, at least in part, on the measured sonic well log and the borehole seismic dataset in the training well, and predicting with the network, the transformed sonic well log in the application well.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein are directed to combining a surface seismic dataset recorded in the two-way seismic time domain with well logs recorded in the depth domain to produce a calibrated surface seismic dataset. Features, such as a reflected signal, detected in the surface seismic dataset over a large spatial area, may then be correlated with features, such as a presence of hydrocarbon indicated by a resistivity well log or a high porosity zone indicated by a sonic log, detected by a well log at a single spatial location. The embodiments disclose training a network, such as a neural network implemented on a computer processor. This training use a set of "training wells" which have both borehole seismic datasets and sonic well logs recorded in them. The embodiment further describes applying the trained network to a set of "application wells", which have sonic well logs but do not have borehole seismic datasets recorded in them.

Figure 1:
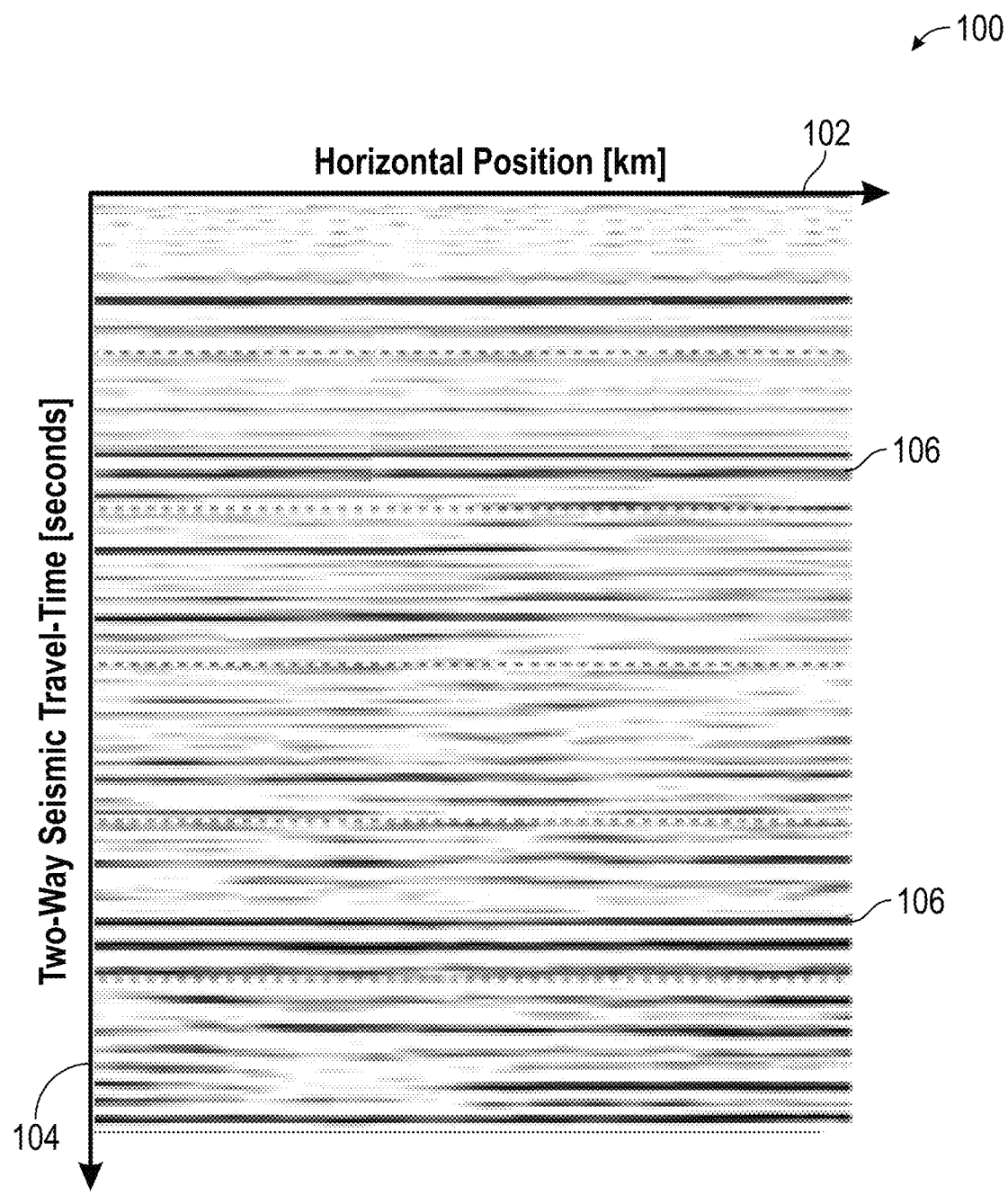
FIG. 1 shows an example of a surface seismic dataset in the two-way seismic time domain.

In accordance with one or more embodiments, FIG. 1 shows an example of a surface seismic dataset (100) for a range of spatial positions on the Earth's surface indicated by the horizontal axis (102). The surface seismic dataset (100) is recorded and displayed as a function of two-way seismic travel-time indicated on the vertical axis (104). Two-way seismic travel-time is the elapsed time between a firing of a seismic source and the detection of a data sample. Dark bands (106) in the surface seismic dataset (100) indicate large values of the detected signal. A large value of the detected signal may be caused by the arrival of large reflection at a seismic receiver located at, or near, the Earth's surface. A large reflection may be generated by the reflection of a down-going seismic wave, generated by a seismic source located on the Earth's surface, at a significant subsurface discontinuity. A subsurface discontinuity may be a geological layer boundary, a fault or fracture, or an interface between different fluids occupying pores within the rock. The two-way seismic travel-time is the sum of the time taken for the down-going seismic wave to travel from the seismic source to the subsurface discontinuity and the time taken for the reflection to travel from the subsurface discontinuity back to the receiver at the surface.

The two-way seismic travel-time (104) of a surface seismic dataset (100) may range from zero to eight seconds or more, depending on the depth of subsurface discontinuity. The surface spatial extent (102) of a surface seismic dataset (100) may cover many tens of kilometers in two orthogonal directions. Consequently, a seismic reflection (106) may be detected in a surface seismic dataset (100) over an area of hundreds of square kilometers. However, because the velocity of seismic wave propagation in the subsurface may be uncertain, the transformation of the two-way seismic travel-time of a reflection to the corresponding depth of the subsurface discontinuity that generated it may contain large uncertainties.

Figure 2:
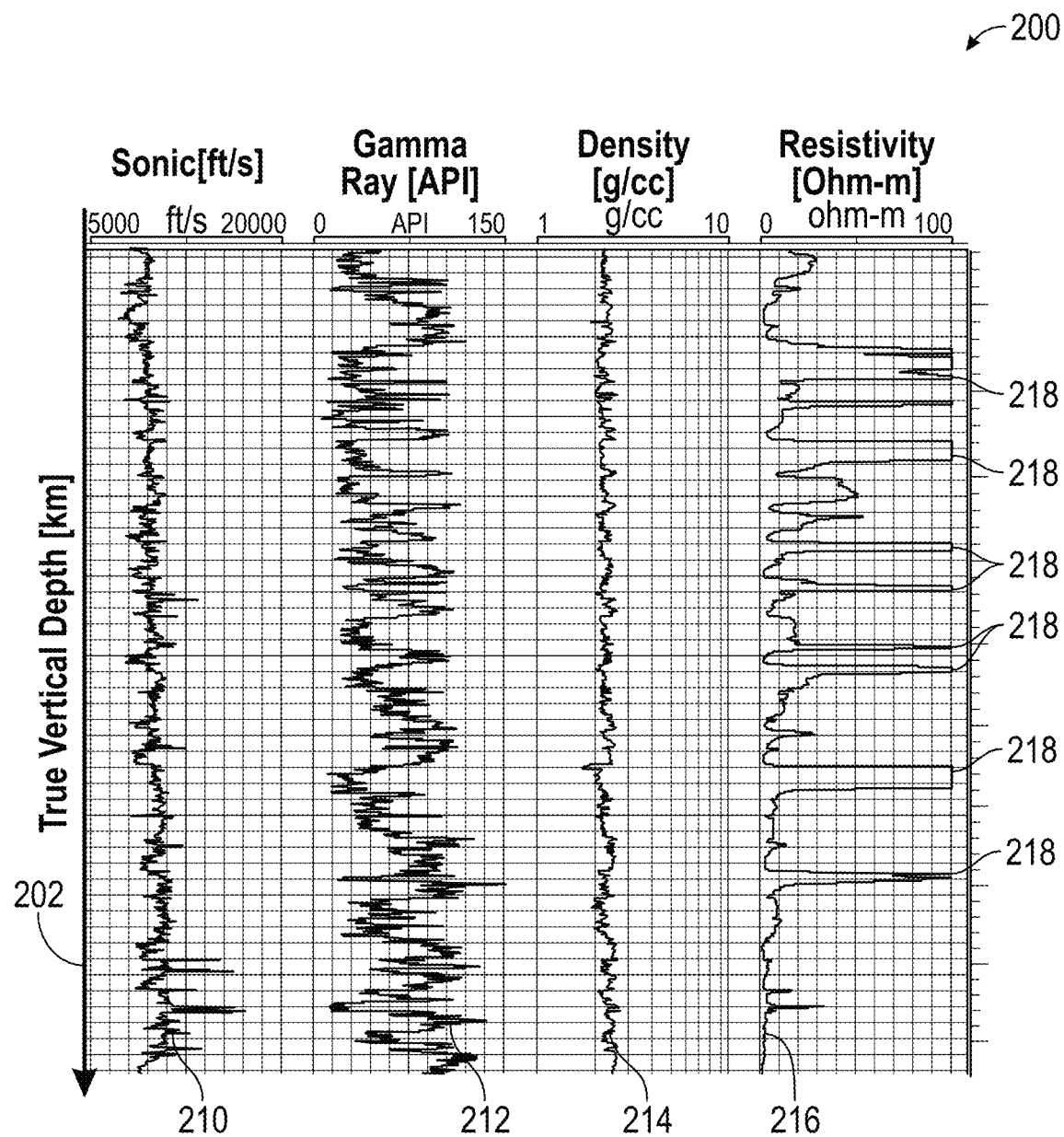
FIG. 2 shows an example of measured well logs in accordance with one or more embodiments.

FIG. 2 shows examples of a plurality of well logs (200). Well logs are recorded by lowering one or more well logging tools into a well and measuring physical quantities of the geological formation surrounding the well. These physical quantities may include, without limitation, the sonic wave propagation speed (210), the gamma ray emissions (212), the mass density of the rock (214), and the electrical resistivity of the rock (216). The well logging tools may be lowered from the surface on a conveyance, such as a wireline cable, a string of drill pipes, and a slickline. The measured depth at which each sample of the well log is recorded may be determined from the length of the conveyance spooled into the well. This measured depth is the distance along the well at which the sample is recorded. If the well is vertical the measured depth is also the depth below the earth's surface. In this case the measured depth is known as the "true vertical depth", as shown on the vertical axis (202) in FIG. 2. In cases where the well has a deviated or horizontal segment, corrections may be made base on the spatial trajectory of the well to determine the true vertical depth below the surface at which the sample was recorded. Thus, the true vertical depth of features in the well log, such as the high resistivity zones (218) that may be oil bearing geological formations, may be determined with low uncertainty.

Figure 3:
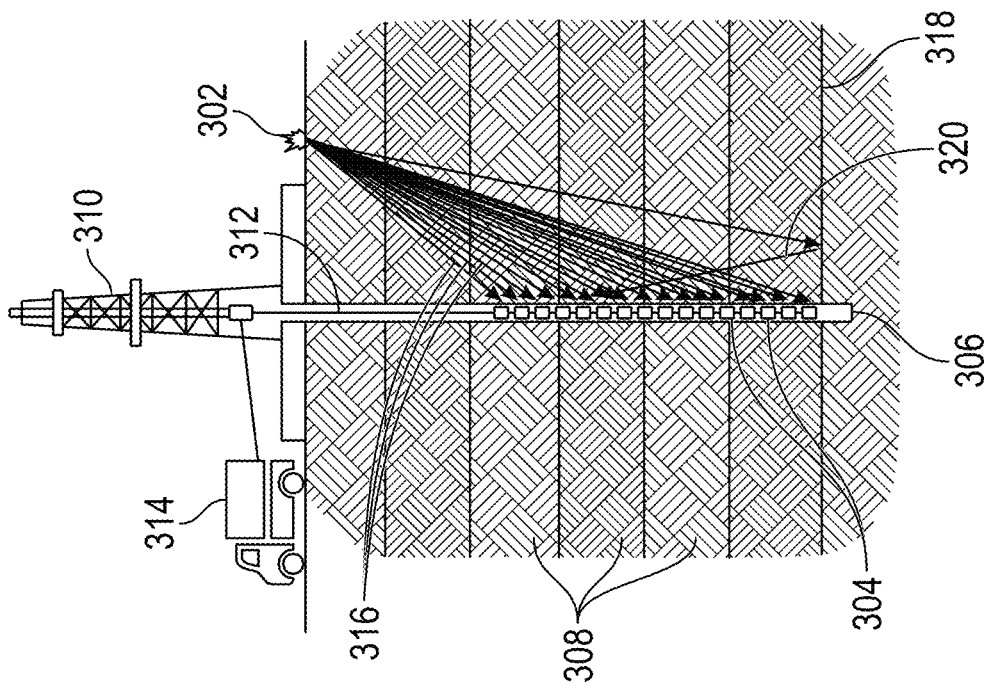
FIG. 3 depicts acquisition of a borehole seismic dataset in accordance with one or more embodiments

FIG. 3 depicts a borehole seismic survey, in accordance with one or more embodiments. Unlike surface seismic datasets, which are acquired using a plurality of seismic sources and seismic receivers located on the earth's surface, a borehole seismic survey typically has at least one seismic source on the surface (302) and a plurality of seismic receivers (304) located in a well (306) that may penetrate a plurality of geological layers (308) in the subsurface region of interest. The plurality of seismic receivers (304) may be suspended from a drill rig (310) or a crane (not shown) using a wireline cable (312). In addition to providing mechanical support to the plurality of seismic receivers (304) in the well (306), the wireline cable (312) may provide electrical power to the plurality of seismic receivers (304) and transmit data recorded by the plurality of seismic receivers (304) to a recording facility (314) on the surface. In operation on land the recording facility (314) may be mounted on a truck. In operation at the recording facility (314) may be part of a drilling rig or production platform or ship (not shown). When the plurality of seismic receivers (304) are deployed into the well the length of cable unspooled may be monitored, thus the depth of each member of the plurality of seismic receivers (304) may be known at any time with a high level of certainty. In particular, the depth of each member of the plurality of seismic receivers (304) may be known at the time at which a borehole seismic dataset is record with a high level of certainty.

When the seismic source (302) is excited, seismic waves (316) may propagate from the seismic source (302) directly to the plurality of seismic receivers (304) where they are recorded. In addition, seismic waves may be reflected from geological discontinuities (318) and these reflected seismic waves (320) may be recorded by the plurality of seismic receivers (304). Borehole seismic datasets may be recorded by Vertical Seismic Profiles (VSP) and/or by Checkshot Surveys (CS). Both VSP and CH may be used to determine the one-way seismic travel-time between the surface and the depth of each member of the plurality of seismic receivers (304). However, while CS are typically used to determine only one-way seismic travel-times, VSP are often also used to record reflected seismic waves (320) from geological discontinuities (318) and to form images thereof, in addition to determining one-way seismic travel-times. CS further differs from a VSP in the number and density of seismic receiver depths recorded. In CS seismic receiver positions may be widely and irregularly located in the well, whereas a VSP usually has numerous seismic receivers positioned at closely and regularly spaced intervals in the well. In both CS and VSP the plurality of seismic receivers (302) may record seismic waves (316) from one or more excitations of the seismic source (302) and then be moved to a deeper or a shallower location in the well (304) before recording data from subsequent excitations of the seismic source (302).

Figure 4:
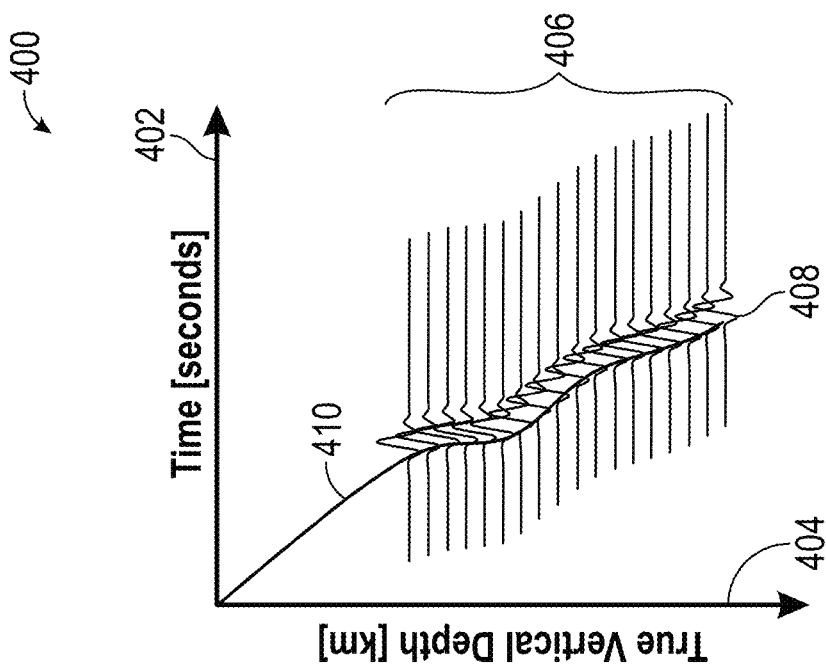
FIG. 4 depicts a borehole seismic dataset in accordance with one or more embodiments.

FIG. 4 depicts a borehole seismic dataset (400), in accordance with one or more embodiments. The variation of displacement with time, known as waveforms (406), caused by the seismic waves (320) and recorded by the plurality of seismic receivers (304) are shown as a function of time, indicated on the horizontal axis (402), and seismic receiver depth, indicated on the vertical axis (404). The one-way seismic travel-time from the surface to each seismic receiver may be determined based, at least in part, on the time (408) at which the seismic wave (316) is first detected on the waveform (406). The curve of one-way seismic travel-time versus depth (410) is depicted in FIG. 4. Borehole seismic datasets may allow the determination of one-way seismic travel-time versus depth (410). One-way seismic travel-time versus depth (410) may be converted to two-way seismic travel-time (104) in which surface seismic datasets are recorded by multiplying the one-way seismic travel-time versus depth (410) by a factor of two to obtain a first estimate of the two-way seismic travel-time versus depth curve.

A second estimate of the two-way seismic travel-time versus depth curve may be generated from the sonic well log by integrating the sonic well log slowness values over the recorded depth values of the sonic well log. Slowness is the reciprocal of velocity and is usually expressed in units of microsecond/ft or microseconds/meter. Since sonic well logs do not typically have samples extending over the full length of the well, i.e., from the toe of the well to the surface, the second estimate of the two-way seismic travel-time versus depth curve has an arbitrary origin, i.e., the value of the two-way seismic travel-time at shallowest sample point of the sonic well log is unknown.

In accordance with one or more embodiments, when both a sonic well log (210) and a borehole seismic dataset (400) are recorded in a well they may be combined to produce a transformed sonic well log in the two-way seismic travel-time domain. An important step in producing a transformed sonic well log is to ensure the sonic well log and the borehole seismic dataset are of sufficient quality with sufficiently low levels of noise or other errors. This quality control (QC) procedure may include the calculation of a sonic drift (SD) curve which quantifies the difference between the first estimate and the second estimate of the two-way seismic travel-time versus depth curve. Even with high-quality and low-noise datasets these two estimates frequently do not agree because the sonic well log is recorded using elastic waves with frequencies typically in the range of 8,000 to 20,000 Hertz and the borehole seismic datasets are recorded using elastic waves typically in the range of 50 to 150 Hertz. Dispersion, the variation of propagation velocity with frequency, is often observed for elastic waves propagating in the earth, and so sonic and seismic waves with very different frequencies are expected to travel with different velocities.

In accordance with one or more embodiments, the problem in calculating an SD curve caused by the arbitrary origin of the second estimate of the two-way seismic travel-time versus depth curve may be overcome by defining the first estimate and the second estimate of the two-way seismic travel-time versus depth curve to be equal at the depth of a "regional marker". In this context, a regional marker refers to a geological feature clearly visible on both sonic well logs (210) and surface seismic datasets (100) which extends over a large geographical area, for example an entire hydrocarbon field or an entire sedimentary basin. If the value of the SD curve at the depth, $Z_{REF}$, at which the well intersects the regional marker is denoted $SD(Z_{REF})$, the corrected SD curve $SD_{CORR}(Z)$ for any depth, Z, may be given by $SD_{CORR}(Z)=SD(Z)-SD(Z_{REF})$.

The corrected SD curve SDCORR(Z) for a plurality of wells may be compared graphically or otherwise, and members of the plurality of wells exhibiting anomalous corrected SD curves may be identified based on quantitative, qualitative, objective, or subjective criteria. In accordance with one or more embodiments, the wells exhibiting anomalous corrected SD curves may be removed from the plurality of wells to produce a plurality of quality-controlled wells. The quality-controlled wells may be divided into three independent subsets referred to as training wells, validation wells, and testing wells, for use in training networks for generating transformed sonic well logs.

The use of these subsets will be described in detail below, but in brief, the training wells may be used for training the networks described below, the validation wells may be used to optimize internal network parameters, known as hyper-parameters, and the testing set may be used to verify that the network can predict transformed sonic well logs in the two-way seismic travel-time domain in wells where a borehole seismic dataset has not been recorded. The training of a network, such as neural networks, may be performed by comparing the output predicted by the network with the desired output determined by other means and modifying the internal designs, configurations and parameter values of the network to achieve a match between the actual and desired outputs. Those skilled in the art will appreciate that while the discussion of FIGS. 5 and 6 below focuses on Long Short Term Memory (LSTM) and Temporal Convolutional Networks (TCN), any suitable neural network may be trained.

Figure 5:
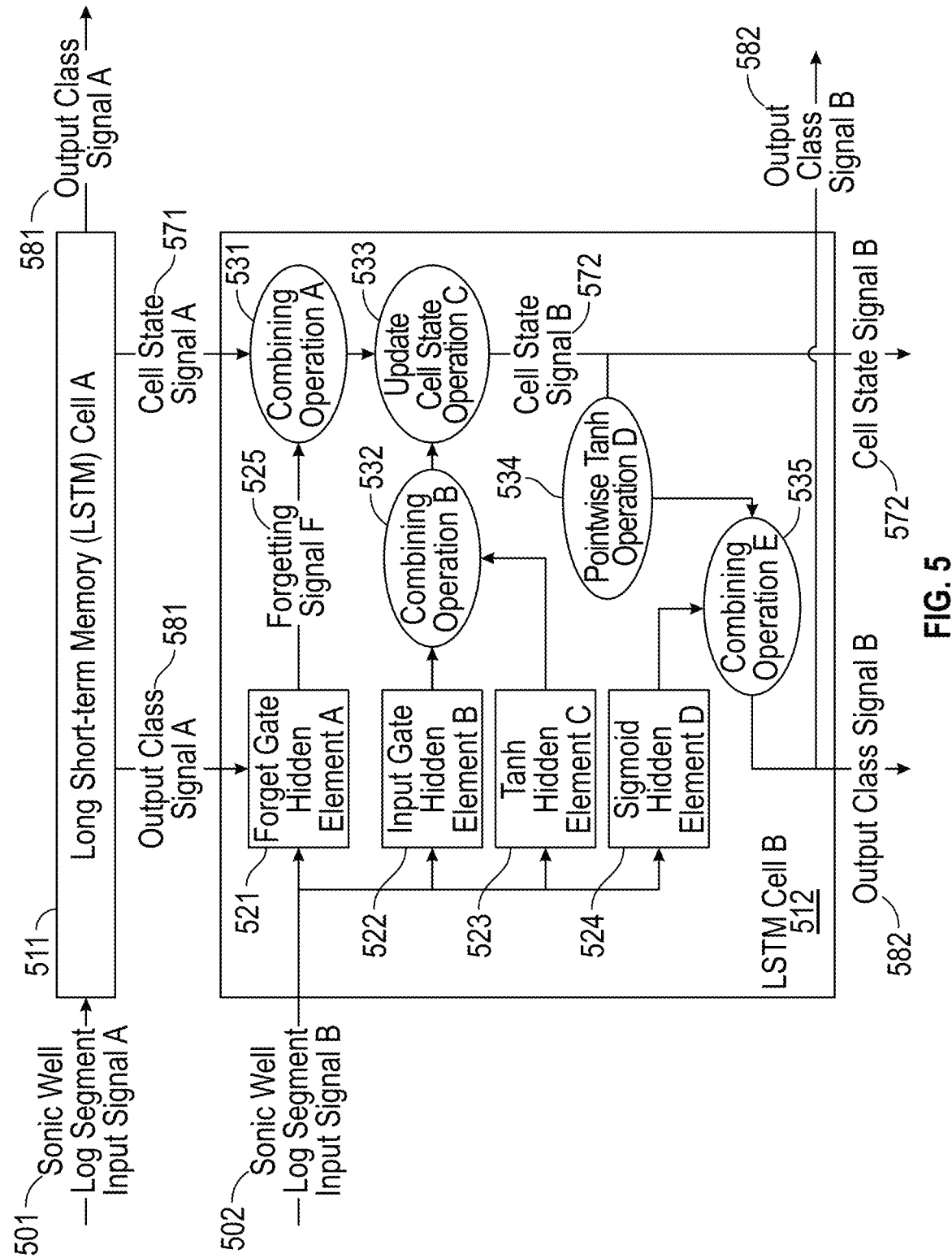
FIG. 5 shows a system in accordance with one or more embodiments.

Turning to FIG. 5, FIG. 5 provides an example of using a network with sonic well log segments in accordance with one or more embodiments. The following example is for explanatory purposes only and not intended to limit the scope of the disclosed technology. Those skilled in the art will appreciate that multiple one-dimensional well log data sequences may be provided as separate input sequences to an LSTM network, but for convenience, only a single well log input segment is shown in FIG. 5. In FIG. 5, various LSTM cells (e.g., LSTM cell A (511), LSTM cell B (512)) obtained various sonic well log input signals (e.g., sonic well log input signal A (501), sonic well log input signal B (502)) to generate various output signals (e.g., output class signal A (581), output class signal B (582)). As shown, a respective LSTM cell in FIG. 5 obtains an output class signal and a cell state signal (e.g., cell state signal A (571), cell state signal B (572)) from a previous LSTM cell along with an sonic well log input signal. Moreover, a respective LSTM cell includes various hidden elements (e.g., forget gate hidden element A (521), input gate hidden element B (522), a hyperbolic tangent, "tan h" hidden element C (523), and a sigmoid hidden element D (524)) along with various pointwise operators (e.g., a combining operation A (531), a combining operation B (532), an update cell state operation C (533), a pointwise tan h operation D (534), and a combining operation E (535)). For example, a cell state signal A (571) may correspond to a vector of information, where a portion of the portion is deleted in response to a forgetting signal F (525) that is generated using an LWD input signal B (502) and a previous output signal (i.e., output class signal A (581)). When the cell state signal A (571) and the forgetting signal F (525) are added together in the combining operation A (531), the filtered resulting signal may then be updated at updated cell state operation C (533) to produce a new cell state signal (i.e., cell state signal B (572)) for transmission to the next LSTM cell. In some embodiments, the output of the LSTM network is variable. For example, the output signal may correspond to a transformed sonic well log segment in the tow-way seismic travel-time domain.

Each hidden element of the LSTM cell (e.g., forget gate hidden element A (521), input gate hidden element B (522), a hyperbolic tangent, "tan h" hidden element C (523), and a sigmoid hidden element D (524)) along with various pointwise operators (e.g., a combining operation A (531), a combining operation B (532), an update cell state operation C (533), a pointwise tan h operation D (534), and a combining operation E (535)), may have one or more parameters that affect the operation of the hidden element and, collectively, of the LSTM cell containing the hidden elements. The value of the parameters may be determined during a training phase of the construction of the network. The determination may be made based on a comparison of the output signals (581, 582) of the LSTM cell and an element of a segment of a transformed sonic well log determined by another method. Training the network may, at least in part, involve changing the values of the parameters to minimize the difference between the output signals of the LSTM cells and the segment of a transformed sonic well log.

Figure 6:
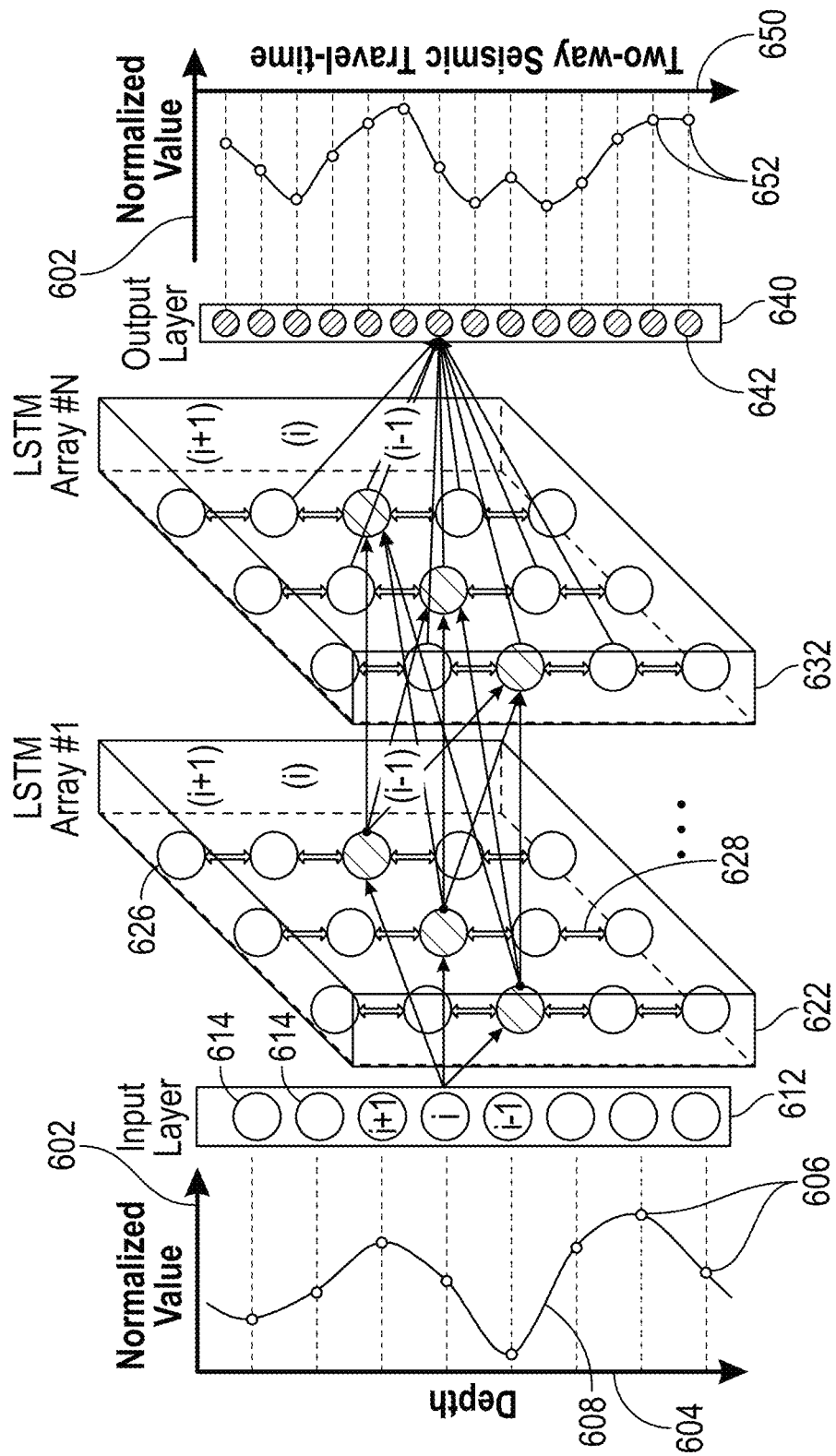
FIG. 6 shows a system in accordance with one or more embodiments.

Turning now to FIG. 6. FIG. 6 depicts a long-short term memory recurrent neural network (LTSM-RNN), in accordance with one or more embodiments, used to transform a sonic well log (608) whose normalized sample (606) values are indicated on the horizontal axis (602) in the depth domain indicated on the vertical axis (604) into a transformed sonic well log in the two-way seismic travel-time domain. The two-way seismic travel-time sample (652) values are indicated on the vertical axis (650).

A LSTM network is a form of artificial neural network used in the field of machine learning, specifically deep learning. The LSTM network depicted in FIG. 6 has an input layer (612) composed of a plurality of input nodes (614) and an output layer (640) composed of a plurality of output nodes (642). Between the input array (612) and the output array (640) are a number, N, of hidden layers or LSTM-arrays. The value of N may vary from one embodiment to another. Each LSTM array (622, 632) contains an array of LSTM cells (626). Each LSTM cell (626) in the first LSTM-array (622) may receive a data value from the input layer (614) and a data value from the LSTM cell (626) directly above it and from the LSTM cell (626) directly below it in the 2D array (624), via a data channel (628). Each LSTM cell (626) in the second and subsequent LSTM-arrays (632) may receive a data value from the corresponding LSTM cell in the preceding LSTM-array, in addition to a data value from the LSTM cell (626) directly above it and from the LSTM cell (626) directly below it in the 2D array (624), via a data channel (628). Here we denote LSTM cells with the same position within the 2D array of adjacent LSTM-arrayss as corresponding LSTM cells. For example, the LSTM cell in the i-th column and j-th row of the first LSTM-array, and the LSTM cell in the i-th column and j-th row of the second LSTM-array are denoted corresponding arrays.

In accordance with one or more embodiments, each LSTM cell in the input layer (612) receives a single depth sample value (606) from a segment of the sonic well log (608). Adjacent depth sample values (606) are passed to adjacent LSTM cells (614) in the input layer (612). From the input layer (612) a depth sample value (606) may be passed from one LSTM cell (614) in the input layer (612) to a plurality of LSTM cells (626) in the first LSTM-layer (622). The plurality of LSTM cells that receive a single depth sample value (606) may all be located in one row of the 2D array (624). The plurality of LSTM cells that receive a single depth sample value (606) may include all of the LSTM cells in one row of the 2D array (624). Each LSTM cell (626) in the first LSTM-layer (622) may combine the sample value received from the input layer (612) with a value from the LSTM cell above it and a value from the LSTM cell below it in the 2D array. Each LSTM cell (626) may produce an output value based, at least in part on the value received from the input layer (612) and the values received from the LSTM cells above it and below it in the 2D array.

In accordance with one or more embodiments, each LSTM cell in the first LSTM-layer (622) may pass the output value to the second LSTM-layer (not shown) where the combination of values from the LSTM cells (626) within the 2D array may be repeated iteratively until the N-th LSTM-layer concludes the sequence. The output value of each LSTM cell in the N-th LSTM-layer may be passed to a plurality of LSTM cells (642) in the output layer (640). Similarly, each LSTM cell (642) in the output layer (640) may receive an output value from a plurality of LSTM cells in the N-th LSTM-layer (632). For example, in accordance with one or more embodiments, all the LSTM cells in one row of the 2D array of LSTM cells in the N-th LSTM-layer (632) may pass an output value to one LSTM cell (642) in the output layer (640). In addition, all the LSTM cells in multiple adjacent rows of the 2D array of LSTM cells in the N-th LSTM-layer (632) may pass an output value to one node (642) in the output layer (640).

Each node (642) in the output layer (640) may combine the input values it receives from the N-th LSTM-layer (632) to predict a sample of the transformed sonic well log (652) in the two-way seismic travel-time domain.

Figure 7:
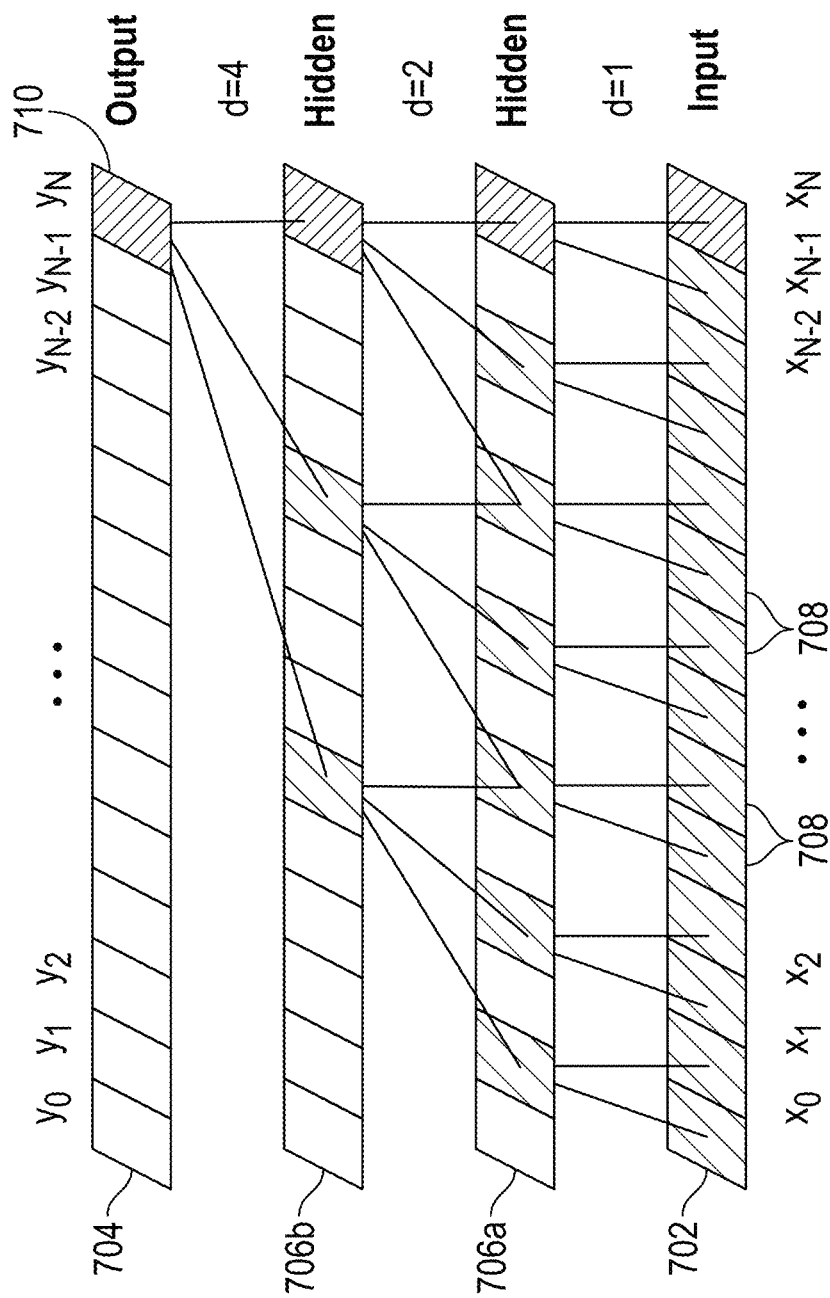
FIG. 7 shows a system in accordance with one or more embodiments.

FIG. 7 depicts an example of a temporal convolutional network (TCN), in accordance with one or more embodiments. A TCN may include an input layer (702), an output layer (704), and one of more hidden layers (706a, 706b). Each layer (702, 704, 706a, and 706b) includes a sequence of cells (708). For each sequence of input values $\{x_0, x_1, x_2, \ldots x_{N-2}, x_{N-1}, x_N\}$ entered at the input layer (702) the network produces a single output value $y_N$ (710). In accordance with one or more embodiments, the TCN iteratively receives sequences of input values displaced by unit to either right, such that $x_N$ of the previous iteration becomes $x_{N-1}$ in the current iteration. The TCN produces one output value $y_1$ for each completed iteration. The network produces an output sequence of the same length as the input sequence after the completion of all iterations.

In accordance with one or more embodiments, the TCN network may be casual in the sense that the output value $y_N$ depends only on the input value $x_i$, $i \leq N$, and does not depend on $x_i$, $i > N$. For example, when used to generate a transformed sonic well log in the two-way travel time the input values $x_i$, $i < N$, may be shallower sonic well log values than the input value $x_N$. In accordance with other embodiments, the TCN may be non-causal and may predict outputs based on shallower or earlier samples as well as deeper or later samples.

A TCN may be characterized by a number of hyperparameters, such as the number of hidden layers; the number, stride, and length of convolutional filters in each layer; and the dilutional parameters. For example, in FIG. 7 four layers are depicted, including an input layer (702), an output layer (704), and two hidden layers (706a, 706b). The number of convolutional filters describe the number of values calculated in the next layer. In FIG. 7 the input layer (702) has seven convolutional filters, the first hidden layer (706a) has three convolutional filters, and the second hidden layer (706b) has one convolution filter. The stride of the convolutional filter describes the degree of overlap exhibited by the inputs to each adjacent convolutional filter. In FIG. 7, the input layer (702) has a stride of one, implying that the first input value of one convolution is adjacent to the final input of the preceding convolutional filter. In contrast, the first hidden layer (706a) has a stride of zero, implying that the first input value of one convolution is also the final input of the preceding convolutional filter. The length of the convolutional filter is the number of input values combined to give the output value. In FIG. 7, the length of the convolutional filter in the input layer (702) is two and the length of the convolutional filter in the first hidden layer (706a) and the second hidden layer (706b) are both three. Finally, the dilatation parameter describes the spacing between input values of the filter. In FIG. 7, the dilatation parameter for the input layer (702) is one, the dilatation parameter of the first hidden layer (706a) is two, and the dilatation parameter of the second hidden layer (706b) is four. The use of dilatational parameters greater than one enable a TCN to base its output on a long sequence of input vales for a given computational cost than would otherwise be possible.

A causal filter in the TCN has the form:

$$y_n = \sum_{i=0}^{k-1} f_i x_{n-i} \qquad \text{Equation (1)}$$

and a non-causal filter may have the form:

$$y_n = \sum_{i=-k}^{k} f_i x_{n-i}. \qquad \text{Equation (2)}$$

where $f_i$ is the i-th filter weight. The value of the filter weights, $f_i$, may be determined during a training phase of the construction of the TCM. The determination may be made based on a comparison of the output $y_i$ of the TCM and an element of a segment of a transformed sonic well log determined by another method. Training the TCN may, at least in part, involve changing the values of the filter weights, $f_i$, to minimize the difference between the output signals of the TCN and the segment of a transformed sonic well log.

Figure 8:
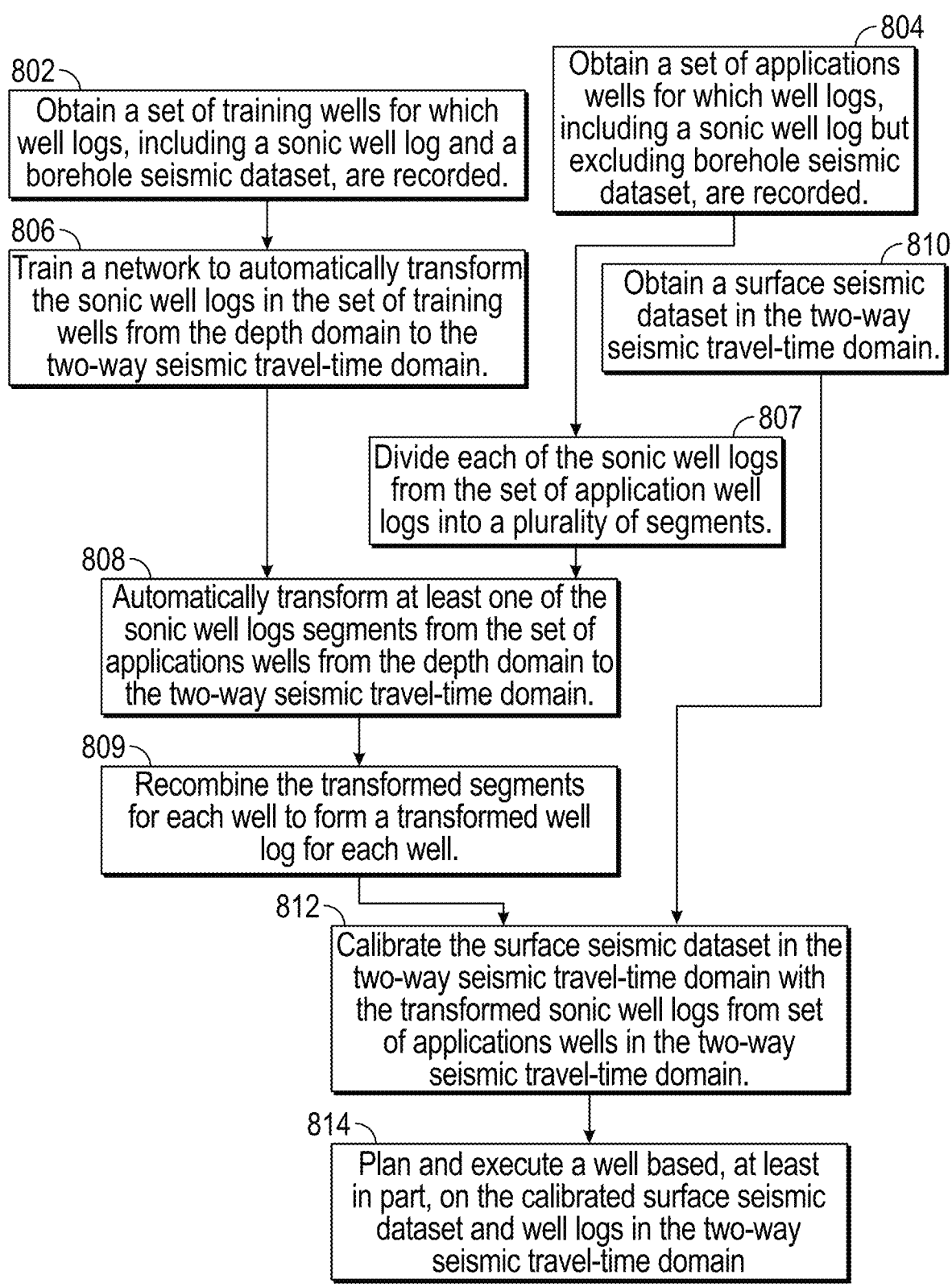
FIG. 8 shows a flowchart in accordance with one or more embodiments.

FIG. 8 shows a flowchart in accordance with one or more embodiments. The flowchart transforms at least one sonic well log from a set of application wells to a two-way seismic travel-time domain and uses the transformed sonic well log to calibrate a surface seismic dataset. The flowchart further plans and executes a well based at least in part on the calibrated surface seismic dataset.

In Step 802 a set of at least one training wells is obtained, in accordance with one or more embodiments. Each member of the set of training wells has well logs, including a sonic well log, and a borehole seismic dataset, recorded in them.

In Step 804, a set of at least one application wells may be obtained, in accordance with one or more embodiments. Each member of the set of applications wells has well logs, including a sonic well log, recorded in them. However, unlike the training wells, the application wells typically do not have a borehole seismic dataset recorded in them. The depth to two-way seismic travel-time transformation will be performed in the application wells by applying the trained network to the sonic well log.

In Step 806 a network is trained to automatically transform the sonic well log recorded in the set of training wells from the depth domain to the two-way seismic travel-time domain. The network and the training of the network is described in more detail below in connection with FIG. 9.

In Step 807, in accordance with one or more embodiments, the sonic well log from each member of the set of application wells may be divided into a plurality of segments. The segments may, in one or more embodiments, be overlapping segments. In other embodiments, the segments may be non-overlapping segments.

In Step 808, in accordance with one or more embodiments, at least one sonic well log segment is transformed from the depth domain to a transformed sonic well log segment in the two-way seismic travel-time domain. In accordance with one or more embodiments, the transformation may be achieved using one or more LSTM networks, one or more TCNs, or a combination of one or more LSTM network and one or more TCNs.

In Step 809, in accordance with one or more embodiments, the transformed sonic well log segments from each application well may be combined to form a single transformed sonic well log for each application sonic well log. The combination may be performed by calculating a cross-correlation between adjacent transformed sonic well log segments. Calculating the cross-correlation may involve calculating a peak cross-correlation value and a corresponding depth lag at which the peak cross-correlation value is positioned.

In Step 810, in accordance with one or more embodiments, a surface seismic dataset recorded in the two-way seismic travel-time domain (100), may be obtained. The surface seismic dataset may be a two-dimensional (2D) or a three-dimensional (3D) surface seismic dataset and may be a land or a marine surface seismic dataset. The surface seismic dataset may be a pre-stack or a post-stack seismic dataset and may a time-migrated dataset.

In Step 812, in accordance with one or more embodiments, the surface seismic dataset in the two-way seismic travel-time domain may be combined with the one or more transformed sonic well logs determined from set of applications wells to form a calibrated surface seismic dataset in the two-way seismic travel-time domain. The combination of the one or more well logs with the surface seismic dataset may include the association of a seismic reflection (106) with a feature in at least one well log (200), such as a sudden change (218) in a resistivity log (216), or a particular range of values in a gamma ray (212) or a density (214) well log.

In Step 814, in accordance with one or more embodiments, a well may be planned and drilled, based at least in part on the calibrated surface seismic dataset and transformed sonic well logs in the two-way seismic travel-time domain. In accordance with one or more embodiments, the well may be an infill well penetrating a part of the hydrocarbon reservoir that lies between existing wells or may be a step-out well beyond the boundary of the portion of the reservoir penetrated by existing wells. The well may target a portion of the reservoir determined to have higher porosity than the surrounding portions of the reservoir based, at least in part, on the calibrated surface seismic dataset. In other embodiments, the well may target a portion of the reservoir determined to contain hydrocarbons rather than based, at least in part upon the calibrated surface seismic dataset.

Figure 9:
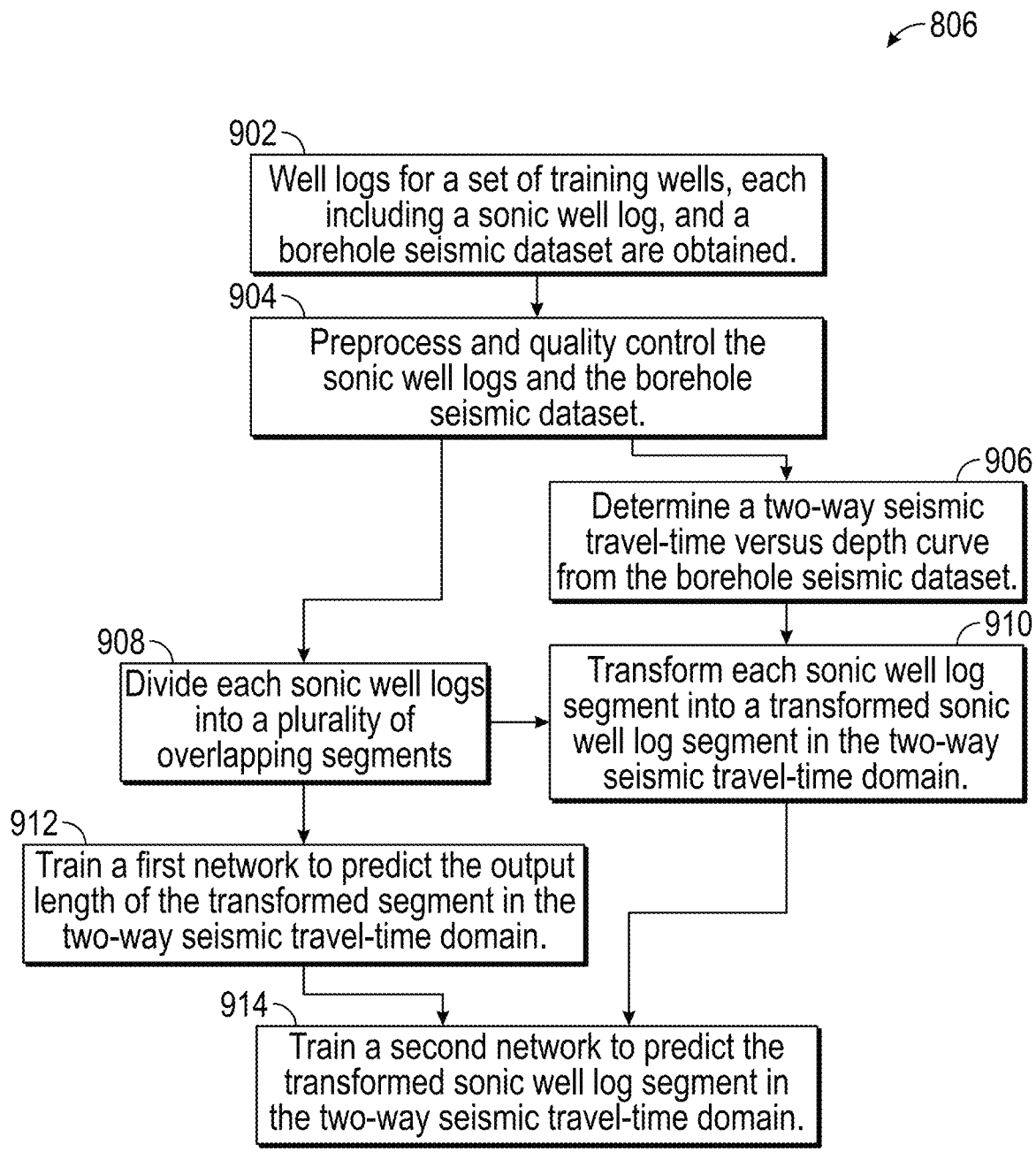
FIG. 9 shows a flowchart in accordance with one or more embodiments.

In accordance with one or more embodiments, FIG. 9 depicts Step 806 in FIG. 8 in more detail. In Step 902, the well logs for a set of training wells are obtained, from Step 804 in FIG. 8. The well logs for each member of the set of training wells includes a sonic well log and a borehole seismic dataset. The sonic well log may be recorded using sonic tool deployed on a wireline cable after the drilling of the well is completed or at an intermediate during the drilling of the well. In other cases, the sonic well log may be recorded using sonic tool deployed on the bottomhole assembly of a drill string during the drilling of the well.

In Step 904, the sonic well logs and borehole seismic datasets may be preprocessed and quality controlled, in accordance with one or more embodiments. The preprocessing may reduce noise and erroneous samples and may include filtering and normalization. The quality control may remove wells from the set of training wells, based at least in part, on the noise or sections of missing samples in either the sonic well log, the borehole seismic dataset, or both.

In Step 906, in accordance with one or more embodiments, a two-way seismic travel-time versus depth curve may be determined, based at least in part, on the borehole seismic dataset. The borehole seismic dataset may be either a VSP dataset, a CS dataset, or a combination of both. Determining the two-way seismic travel-time versus depth curve may involve first determining a one-way seismic travel-time versus depth curve, and later determining the two seismic travel-time versus depth curve from the one-way seismic travel-time versus depth curve.

In Step 908, in accordance with one or more embodiments, each sonic well in the set of training wells may be divided into a plurality of overlapping segments. In other embodiments the plurality of segments may not be overlapping segments. In still other embodiments, the whole of each sonic well log may be treated as a single segment.

In step 910, each sonic well log segment may be transformed into a transformed sonic well log segment in the two-way seismic travel-time domain. The transformation may be based, at least in part, on the two-way seismic travel-time versus depth curve determined in Step 906.

In accordance with one or more embodiments, in Step 912 a first network to may be trained to predict the output length of the transformed sonic well log segment in the two-way seismic travel-time domain. The first network may be a LSTM network or may be a TCN. In other embodiments, Step 912 may be omitted, and the output length of the transformed sonic well log segment may be assumed to be fixed and may be padded with zero values if required.

In Step 914, in accordance with one or more embodiments, a second network may be trained to predict the transformed sonic well log segment in the two-way seismic travel-time domain. The second network may be a LSTM network or may be a TCN.

Figure 10:
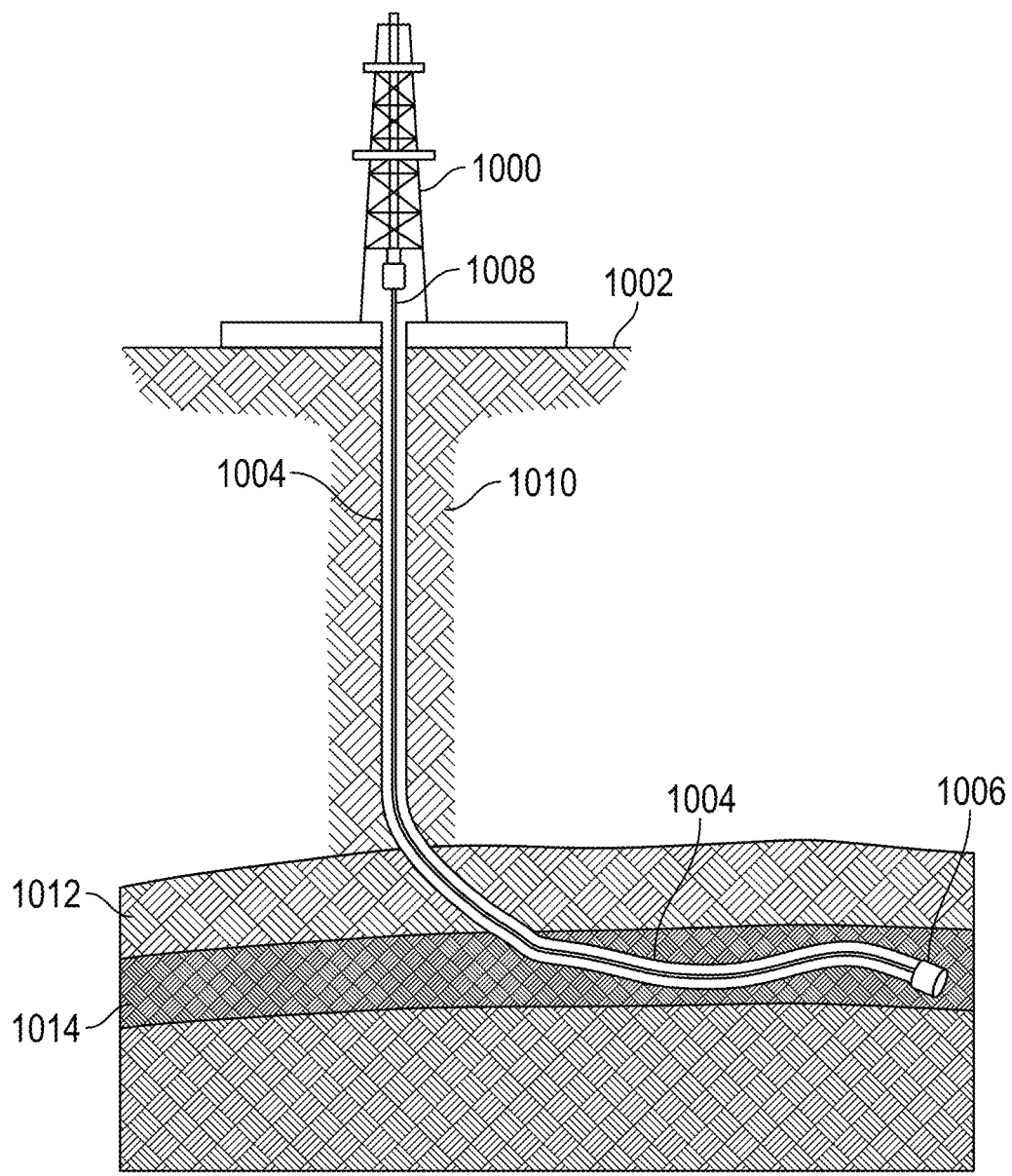
FIG. 10 shows a system in accordance with one or more embodiments.

FIG. 10 illustrates systems in accordance with one or more embodiments. As shown in FIG. 10, a borehole (1002) may be drilled by a drill bit (1004) attached by a drillstring (1006) to a drill rig (1000) located on the Earth's surface (1002). The borehole may traverse a plurality of overburden layers (1010) and one or more cap-rock layers (1012) to a hydrocarbon reservoir (1014). A calibrated surface seismic dataset may be used to plan and perform the trajectory of the borehole (1006) to intersect as many hydrocarbon reservoirs (1014) as are determined to be present.

Figure 11:
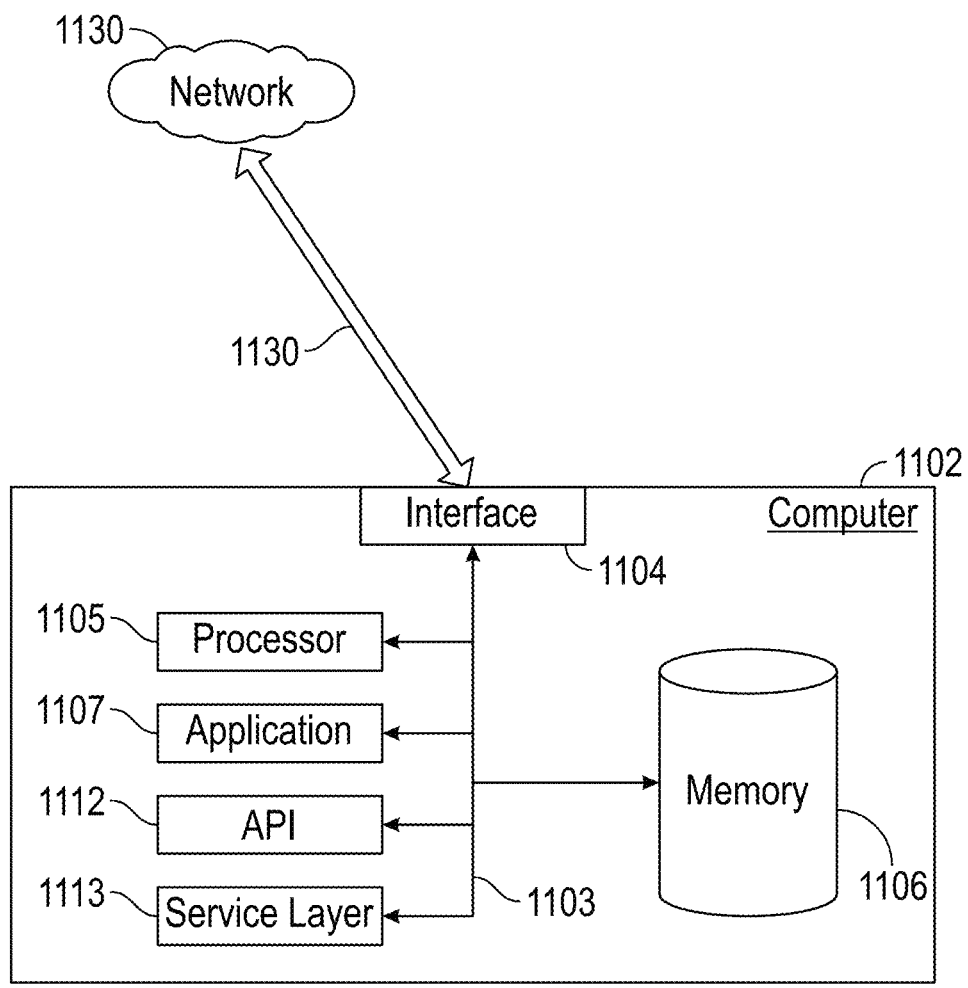
FIG. 11 shows computer system in accordance with one or more embodiments.

FIG. 11 further depicts a block diagram of a computer system (1102) used to provide computational functionalities associated with described algorithms, methods, functions, processes, flows, and procedures as described in this disclosure, according to one or more embodiments. The illustrated computer (1102) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1102) may include a computer that includes an input device, such as a keypad, keyboard, touch screen, or other device that can accept user information, and an output device that conveys information associated with the operation of the computer (1102), including digital data, visual, or audio information (or a combination of information), or a Graphical User Interface (GUI).

The computer (1102) can serve in a role as a client, network component, a server, a database or other persistency, or any other component (or a combination of roles) of a computer system for performing the subject matter described in the instant disclosure. The illustrated computer (1102) is communicably coupled with a network (1130). In some implementations, one or more components of the computer (1102) may be configured to operate within environments, including cloud-computing-based, local, global, or other environment (or a combination of environments).

At a high level, the computer (1102) is an electronic computing device operable to receive, transmit, process, store, or manage data and information associated with the described subject matter. According to some implementations, the computer (1102) may also include or be communicably coupled with an application server, e-mail server, web server, caching server, streaming data server, business intelligence (BI) server, or other server (or a combination of servers).

The computer (1102) can receive requests over network (1130) from a client application (for example, executing on another computer (1102)) and responding to the received requests by processing the said requests in an appropriate software application. In addition, requests may also be sent to the computer (1102) from internal users (for example, from a command console or by other appropriate access method), external or third-parties, other automated applications, as well as any other appropriate entities, individuals, systems, or computers.

Each of the components of the computer (1102) can communicate using a system bus (1103). In some implementations, any or all of the components of the computer (1102), both hardware or software (or a combination of hardware and software), may interface with each other or the interface (1104) (or a combination of both) over the system bus (1103) using an application programming interface (API) (1112) or a service layer (1113) (or a combination of the API (1112) and service layer (1113). The API (1112) may include specifications for routines, data structures, and object classes. The API (1112) may be either computer-language independent or dependent and refer to a complete interface, a single function, or even a set of APIs. The service layer (1113) provides software services to the computer (1102) or other components (whether or not illustrated) that are communicably coupled to the computer (1102). The functionality of the computer (1102) may be accessible for all service consumers using this service layer. Software services, such as those provided by the service layer (1113), provide reusable, defined business functionalities through a defined interface. For example, the interface may be software written in JAVA, C++, or other suitable language providing data in extensible markup language (XML) format or another suitable format. While illustrated as an integrated component of the computer (1102), alternative implementations may illustrate the API (1112) or the service layer (1113) as stand-alone components in relation to other components of the computer (1102) or other components (whether or not illustrated) that are communicably coupled to the computer (1102). Moreover, any or all parts of the API (1112) or the service layer (1113) may be implemented as child or sub-modules of another software module, enterprise application, or hardware module without departing from the scope of this disclosure.

The computer (1102) includes an interface (1104). Although illustrated as a single interface (1104) in FIG. 11, two or more interfaces (1104) may be used according to particular needs, desires, or particular implementations of the computer (1102). The interface (1104) is used by the computer (1102) for communicating with other systems in a distributed environment that are connected to the network (1130). Generally, the interface (1104 includes logic encoded in software or hardware (or a combination of software and hardware) and operable to communicate with the network (1130). More specifically, the interface (1104) may include software supporting one or more communication protocols associated with communications such that the network (1130) or interface's hardware is operable to communicate physical signals within and outside of the illustrated computer (1102).

The computer (1102) includes at least one computer processor (1105). Although illustrated as a single computer processor (1105) in FIG. 11, two or more processors may be used according to particular needs, desires, or particular implementations of the computer (1102). Generally, the computer processor (1105) executes instructions and manipulates data to perform the operations of the computer (1102) and any algorithms, methods, functions, processes, flows, and procedures as described in the instant disclosure.

The computer (1102) also includes a memory (1106) that holds data for the computer (1102) or other components (or a combination of both) that can be connected to the network (1130). For example, memory (1106) can be a database storing data consistent with this disclosure. Although illustrated as a single memory (1106) in FIG. 11, two or more memories may be used according to particular needs, desires, or particular implementations of the computer (1102) and the described functionality. While memory (1106) is illustrated as an integral component of the computer (1102), in alternative implementations, memory (1106) can be external to the computer (1102).

The application (1107) is an algorithmic software engine providing functionality according to particular needs, desires, or particular implementations of the computer (1102), particularly with respect to functionality described in this disclosure. For example, application (1107) can serve as one or more components, modules, applications, etc. Further, although illustrated as a single application (1107), the application (1107) may be implemented as multiple applications (1107) on the computer (1102). In addition, although illustrated as integral to the computer (1102), in alternative implementations, the application (1107) can be external to the computer (1102).

There may be any number of computers (1102) associated with, or external to, a computer system containing computer (1102), wherein each computer (1102) communicates over network (1130). Further, the term "client," "user," and other appropriate terminology may be used interchangeably as appropriate without departing from the scope of this disclosure. Moreover, this disclosure contemplates that many users may use one computer (1102), or that one user may use multiple computers (1102).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method for automatically transforming sonic well logs from a depth domain to a seismic two-way travel-time domain, comprising:

obtaining a training well, the training well having a measured sonic well log in the depth domain and a borehole seismic dataset in the depth domain;

obtaining an application well, the application well having a measured sonic well log in the depth domain;

training, using a computer processor, a network to predict a transformed sonic well log for the training well based, at least in part, on the measured sonic well log in the training well and the borehole seismic dataset in the training well, wherein training the network to predict the transformed sonic well log for the training well, comprises:

dividing the measured sonic well log into a plurality of overlapping segments of measured sonic well log in the depth domain, transforming the plurality of overlapping segments into a plurality of transformed segments in a time domain based, at least in part on the borehole seismic dataset, training an artificial network to predict the plurality of transformed segments in the time domain based, at least in part, on the plurality of overlapping segments of the measured sonic well log in the depth domain, and combining the plurality of transformed segments to form the transformed sonic well log; and predicting, using a computer processor and with the network, the transformed sonic well log for the application well.

2. The method of claim 1, wherein the transformed sonic well log is a transformed sonic well log in a two-way seismic travel-time of the borehole seismic dataset.

3. The method of claim 1, further comprising:

calibrating a surface seismic dataset in the time domain of the borehole seismic dataset with the transformed sonic well log; and determining a presence of a hydrocarbon reservoir based, at least in part, on the calibrated surface seismic dataset.

4. The method of claim 3, further comprising:

determining, by the computer processor, a well path through a subterranean region of interest based, at least in part, on the presence of the hydrocarbon reservoir; and drilling, using a drilling system, the well path using a drilling system.

5. The method of claim 1, wherein transforming the plurality of overlapping segments into a plurality of transformed segments, comprises:

determining a seismic travel-time to depth curve from the borehole seismic dataset; and transforming the plurality of overlapping segments of sonic well logs in the depth domain into the time domain using the curve.

6. The method of claim 1, wherein combining the plurality of transformed segments to form the transformed sonic well log is performed using a cross-correlation.

7. The method of claim 6, wherein using a cross-correlation comprises:

determining a time-lag between each adjacent-in-time pair of transformed segments by locating a peak value of the cross-correlation between members of the adjacent-in-time pair;

determining the time-lag corresponding to the peak value; and shifting, cumulatively in time, a later member of the pair by the determined time-lag.

8. The method of claim 1, wherein training the network to predict the plurality of transformed segments, comprises:

training a first prediction network to predict a length of each of the plurality of transformed segments in the time domain based, at least in part, on the plurality of overlapping segments of sonic well log in the depth domain; and training a second prediction network to predict the plurality of transformed segments in the time domain based, at least in part, on the plurality of overlapping segments of sonic well log in the depth domain.

9. The method of claim 8, wherein the first and second prediction networks are each a recurrent neural network or a temporal convolutional network.

10. A non-transitory computer readable medium storing instructions executable by a computer processor, the instructions comprising functionality for:

obtaining a training well, the training well having a measured sonic well log in a depth domain and a borehole seismic dataset in the depth domain;

obtaining an application well, the application well having a measured sonic well log in the depth domain;

training, using a computer processor, a network to predict a transformed sonic well log for the training well based, at least in part, on the measured sonic well log in the training well and the borehole seismic dataset in the training well, wherein training the network to predict the transformed sonic well log for the training well, comprises:

dividing the measured sonic well log into a plurality of overlapping segments of measured sonic well log in the depth domain, transforming the plurality of overlapping segments into a plurality of transformed segments in a time domain based, at least in part on the borehole seismic dataset, training an artificial network to predict the plurality of transformed segments in the time domain based, at least in part, on the plurality of overlapping segments of the measured sonic well log in the depth domain, and combining the plurality of transformed segments to form the transformed sonic well log; and predicting, using a computer processor and with the network, the transformed sonic well log for the application well.

11. The non-transitory computer readable medium of claim 10, wherein the transformed sonic well log is a transformed sonic well log in a two-way seismic travel-time of the borehole seismic dataset.

12. The non-transitory computer readable medium of claim 10, the instructions further comprising functionality for:

calibrating a surface seismic dataset in the time domain of the borehole seismic dataset with the transformed sonic well log; and determining a presence of a hydrocarbon reservoir based, at least in part, on the calibrated surface seismic dataset.

13. The non-transitory computer readable medium of claim 12, the instructions further comprising functionality for determining, by the computer processor, a well path through a subterranean region of interest based, at least in part, on the presence of the hydrocarbon reservoir.

14. The non-transitory computer readable medium of claim 10, wherein transforming the plurality of overlapping segments into a plurality of transformed segments, comprises:

determining a seismic travel-time to depth curve from the borehole seismic dataset; and transforming the plurality of overlapping segments of sonic well logs in the depth domain into the time domain using the curve.

15. The non-transitory computer readable medium of claim 10, wherein combining the plurality of transformed segments to form the transformed sonic well log is performed using a cross-correlation.

16. The non-transitory computer readable medium of claim 15, wherein using a cross-correlation comprises:

determining a time-lag between each adjacent-in-time pair of transformed segments by locating a peak value of the cross-correlation between members of the adjacent-in-time pair;

determining the time-lag corresponding to the peak value; and shifting, cumulatively in time, a later member of the pair by the determined time-lag.

17. The non-transitory computer readable medium of claim 10, wherein training the network to predict the plurality of transformed segments, comprises:

training a first prediction network to predict a length of each of the plurality of transformed segments in the time domain based, at least in part, on the plurality of overlapping segments of sonic well log in the depth domain; and training a second prediction network to predict the plurality of transformed segments in the time domain based, at least in part, on the plurality of overlapping segments of sonic well log in the depth domain.

18. The non-transitory computer readable medium of claim 17, wherein the first and second prediction networks are each a recurrent neural network or a temporal convolutional network.

* * * * *